J. H. MULLOY.
CORE JACK.
APPLICATION FILED DEC. 17, 1915.
1,233,260.
Patented July 10, 1917.
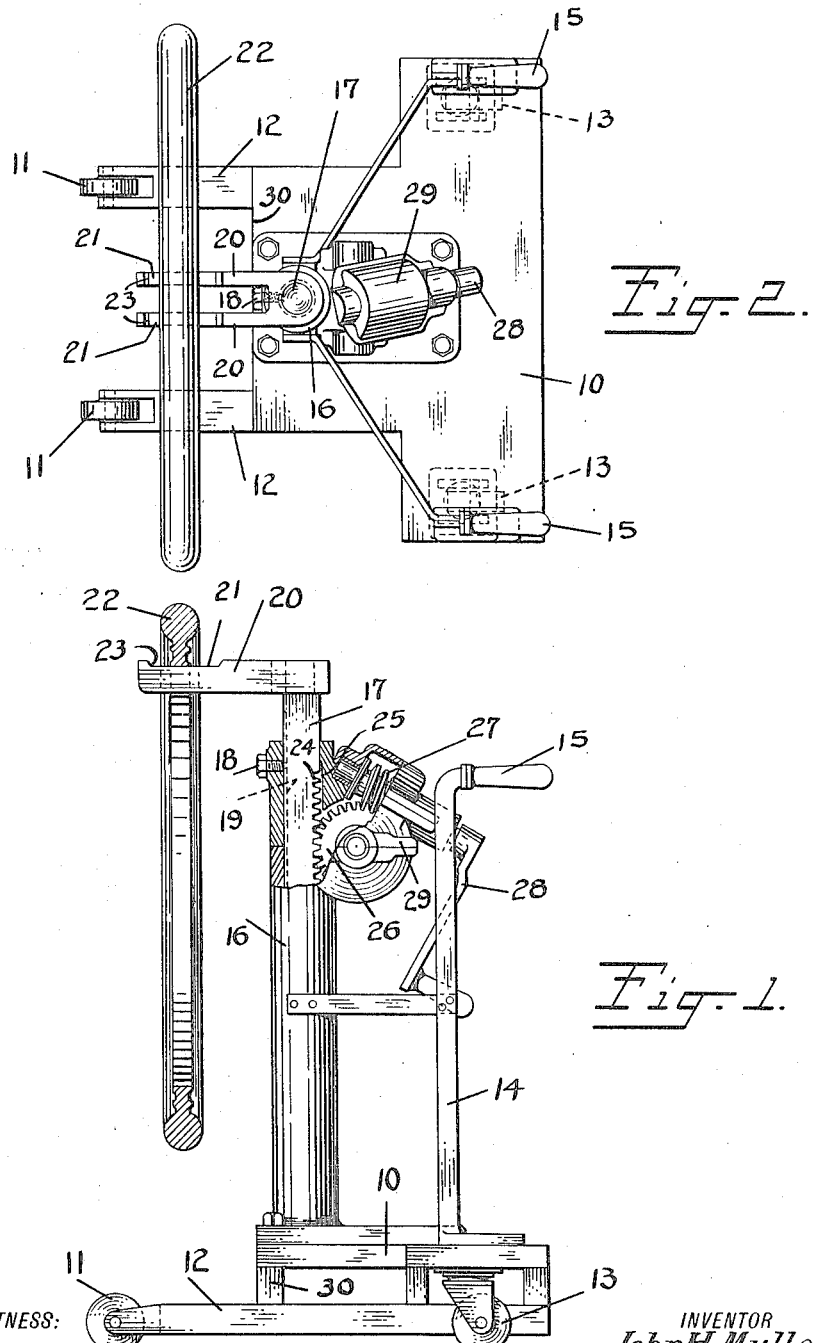

UNITED STATES PATENT OFFICE.

JOHN H. MULLOY, OF DETROIT, MICHIGAN, ASSIGNOR TO MORGAN & WRIGHT, A CORPORATION OF MICHIGAN.

CORE-JACK.

1,233,260.  Specification of Letters Patent.  Patented July 10, 1917.

Application filed December 17, 1915. Serial No. 67,353.

*To all whom it may concern:*

Be it known that I, JOHN H. MULLOY, a citizen of the United States, residing at Detroit, county of Wayne, and State of Michigan, have invented certain new and useful Improvements in Core-Jacks, of which the following is a full, clear, and exact description.

This invention relates to core jacks and has for an object to provide an extremely simple and effective device for manipulating and transporting tire forming cores.

In the manufacture of tires, a tire is built upon a metal core which is usually so heavy as to prevent manual lifting and transportation. It is necessary to raise or lower the heavy core through a space of several feet to apply or remove it from apparatus for rotating the core during the tire building operation, and from apparatus for repairing the core when necessary, and this is usually done by a block and tackle. The present invention provides a machine for effectively raising and lowering the core to apply or remove it from any desired machine, or truck, and provides means whereby the core may be easily transported to and from any place in the factory.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

The invention can be readily understood from the following description taken in connection with the accompanying drawing, in which—

Figure 1 is a side elevation of the device with a core applied thereto, a part of the device being in section;

Fig. 2 is a plan view of the device.

Referring now to the drawing in which like characters of reference designate similar parts, 10 designates in general a support which may be constructed in any desired manner and is preferably T shaped as shown in Fig. 2 to permit of easy manipulation in crowded floor spaces. It is equipped at the front with wheels 11 which are carried upon forwardly projecting bars 12 which serve to space the wheels from the front edge of the support and thus permit of their being run under projecting parts of a machine or truck to position the support as close to the same as possible. The support is equipped at the back with casters 13 which permit of the support being readily steered during transportation. Upstanding handles 14 are secured to the dirigible support directly over the casters and have outturned grips 15 at a convenient height to be grasped by the operator for transporting and maneuvering the device.

Secured to the support in a centrally located position relatively to the supporting wheels and casters, is a hollow standard 16 which carries within its bore a rack 17, there being a guide 18 in the standard fitting in a groove 19 in the rack to prevent turning of the latter in the standard. The rack is provided at the top with a forked arm 20 which extends horizontally beyond the front edge of the support. The branches of the arm are equipped in the top edges with alined grooves 21, adapted to receive a tire forming core 22 and suspend the core at spaced points from the inside periphery as shown, the end walls 23 of the grooves 21 limiting any twisting movement of the core which may occur and preventing accidental escape of the core.

The rack 17 is provided on the rear edge with rack teeth 24 which are exposed through an opening 25 in the rear side of the standard 16 and there mesh with a pinion 26 which in turn engages a worm 27 that may be turned in either direction by means of a crank handle 28 to rotate the pinion and raise or lower the rack. The pinion and worm are mounted in suitable bearings arranged in a common gear case 29. The worm locks the pinion stationary at all times except during rotation of the crank handle 28 so that the rack is maintained in any desired adjusted position without additional locking devices.

In operation, suppose it is necessary to transport a core from a truck to a tire building machine. The device is rolled up to the truck until the front wheels 11 pass underneath the platform thereof and the edge of the truck engages the front portions 30 which perform the function of stops to limit further advance of the device toward the truck platform. The heavy metal core may now easily be rocked up on end and suspended upon the branches of the arm 20. The device is now withdrawn from the truck and rolled up to the core receiving spider of the tire building machine. There the crank handle 28 is rotated until the core is raised sufficiently to pass over the engaging spokes of the spider, one of the spokes entering the space between the branches of the arm 20 and properly locating the core, whereupon the device may be maneuvered until the core surrounds and is engaged by said spokes. The handle lever 28 may then be turned to lower the arm and the device is then withdrawn from the machine.

What is claimed is:

1. A device of the class described comprising a dirigible wheeled support, a member thereon having branches for suspending a tire forming core from the inner periphery at spaced points, the space between said branches permitting of entry between the branches of a core supporting spoke to which the core is to be applied or from which it is to be removed, and means on the support for raising and lowering said member.

2. A device of the class described comprising a wheeled support adapted to be run at the forward end underneath a truck or the like, means for limiting the protrusion of the support thereunder, a member on the support having branches for suspending a tire forming core from the inner periphery at spaced points, the space between said branches permitting of entry of a core supporting spoke to which the core is to be applied or from which it is to be removed, and means on the support for raising and lowering the core suspending means.

3. A device of the class described comprising a dirigible support, a standard thereon, a rack slidably fitted within the standard, a horizontally projecting arm on the rack, said arm being formed with branches for suspending a tire forming core from the inner periphery at spaced points, the space between said branches permitting of entry between the branches of a core supporting spoke to which the core is to be applied or from which it is to be removed, a worm and pinion device for raising and lowering said rack, and means for advancing and maneuvering said support.

Signed at Detroit, Michigan, December 3, 1915.

JOHN H. MULLOY.